(12) United States Patent
Horishita et al.

(10) Patent No.: US 11,030,499 B2
(45) Date of Patent: Jun. 8, 2021

(54) IMAGE FORMING APPARATUS, METHOD OF CONTROLLING THE SAME, AND STORAGE MEDIUM

(71) Applicant: CANON KABUSHIKI KAISHA, Tokyo (JP)

(72) Inventors: Yusuke Horishita, Fujisawa (JP); Kanako Ogura, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/815,492

(22) Filed: Mar. 11, 2020

(65) Prior Publication Data

US 2020/0293844 A1 Sep. 17, 2020

(30) Foreign Application Priority Data

Mar. 13, 2019 (JP) .............................. JP2019-046378

(51) Int. Cl.
 *G06K 15/00* (2006.01)
 *G06K 15/14* (2006.01)
(52) U.S. Cl.
 CPC .......... *G06K 15/401* (2013.01); *G06K 15/14* (2013.01)
(58) Field of Classification Search
 CPC .............................. G06K 15/401; G06K 15/14
 See application file for complete search history.

(56) References Cited

U.S. PATENT DOCUMENTS

| | | | | |
|---|---|---|---|---|
| 5,864,652 A * | 1/1999 | Murahashi | ............. | G06K 15/02 358/1.16 |
| 7,072,058 B1 * | 7/2006 | Miyazaki | ........... | H04N 1/32561 358/1.14 |
| 10,423,557 B2 | 9/2019 | Shinto et al. | | |
| 2002/0039188 A1 * | 4/2002 | Ueda | ................... | H04N 1/32561 358/1.6 |
| 2005/0111026 A1 * | 5/2005 | Kaneko | ................ | H04N 1/3263 358/1.13 |
| 2005/0248599 A1 * | 11/2005 | Sakamoto | ............ | G06K 15/102 347/9 |
| 2010/0060933 A1 * | 3/2010 | Ogura | .................. | H04N 1/0473 358/1.16 |
| 2017/0091601 A1 * | 3/2017 | Mitobe | .................... | G06F 13/42 |
| 2018/0074986 A1 * | 3/2018 | Shinto | .................... | G06F 3/1279 |
| 2018/0213103 A1 * | 7/2018 | Tanaka | ............... | H04N 1/00904 |
| 2020/0045203 A1 * | 2/2020 | Kaneda | ..................... | G06T 1/00 |

FOREIGN PATENT DOCUMENTS

| | | | | |
|---|---|---|---|---|
| JP | 2016024408 A | * | 2/2016 | |
| JP | 2016024408 A | | 2/2016 | |
| JP | 2018045367 A | | 3/2018 | |

* cited by examiner

*Primary Examiner* — Ted W Barnes
(74) *Attorney, Agent, or Firm* — Venable LLP

(57) ABSTRACT

The present invention is directed to to an image forming apparatus including a system control module that controls the image forming apparatus; a first memory device used by the system control module; an image processing module that processes image data to be inputted to the image forming apparatus; a second memory device in which image data processed by the image processing module is stored via an image memory bus; and a memory controller that transfers and writes the image data processed by the image processing module into the first memory device without going through the image memory bus, and issues an end interrupt to the system control module each time image data of a predetermined size has been written.

13 Claims, 15 Drawing Sheets

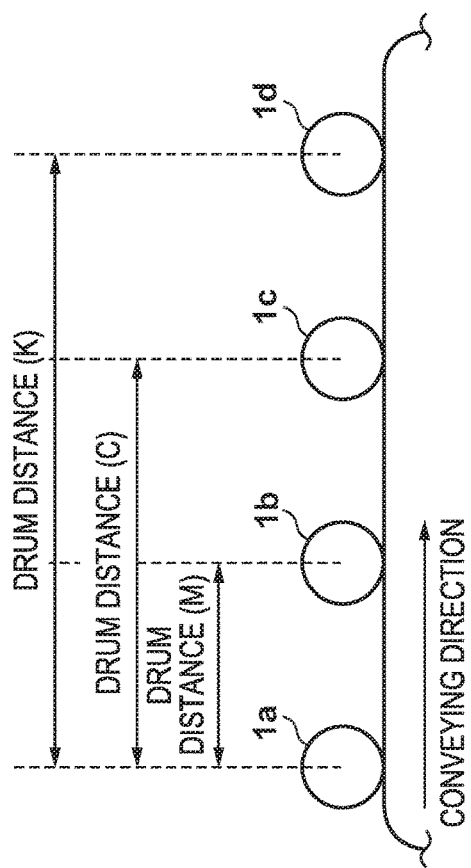
FIG. 5A
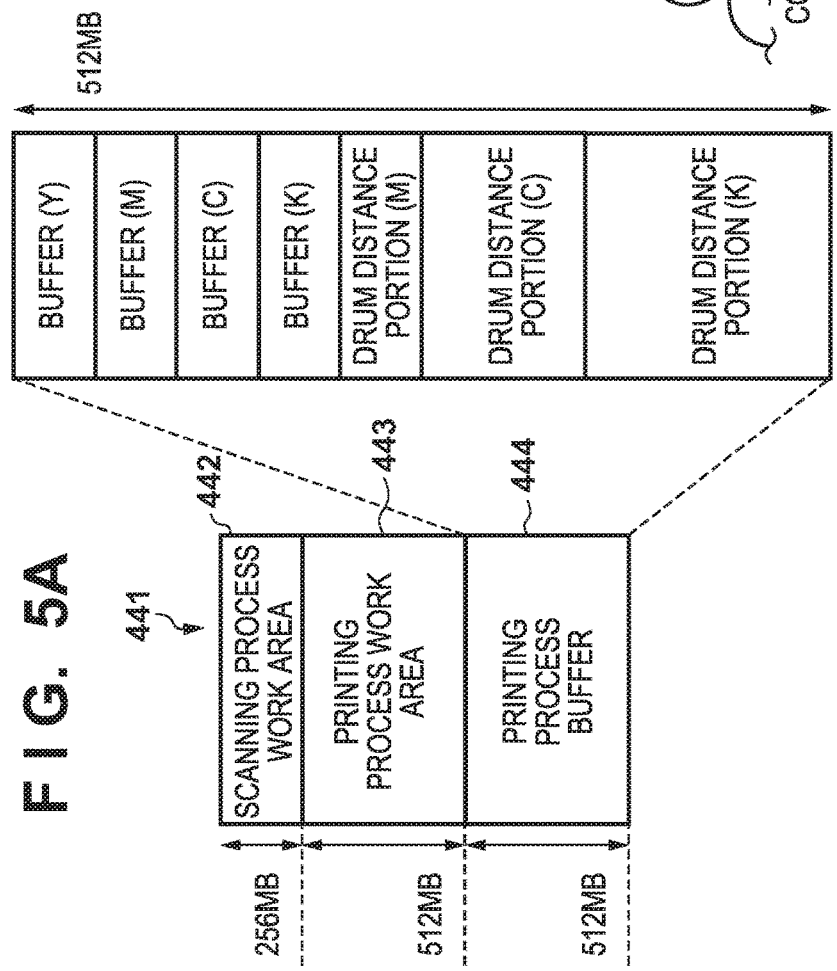
FIG. 5B
FIG. 5C

FIG. 7A

| 336 | | | | | | | | | | | 335 |
|---|---|---|---|---|---|---|---|---|---|---|---|
| 120 | 110 | 110 | 70 | 70 | 70 | 70 | 70 | 70 | 70 | 70 | 70 |
| 130 | 120 | 110 | 70 | 70 | 70 | 70 | 70 | 70 | 70 | 70 | 70 |
| 130 | 130 | 120 | 70 | 70 | 70 | 70 | 70 | 70 | 70 | 70 | 70 |
| 140 | 130 | 130 | 120 | 110 | 110 | 70 | 70 | 70 | 70 | 70 | 70 |
| 150 | 140 | 130 | 130 | 120 | 110 | 70 | 70 | 70 | 70 | 70 | 70 |
| 150 | 150 | 140 | 130 | 130 | 120 | 70 | 70 | 70 | 70 | 70 | 70 |

FIG. 7B

| | | | 337 |
|---|---|---|---|
| 120 | 70 | 70 | 70 |
| 140 | 120 | 70 | 70 |

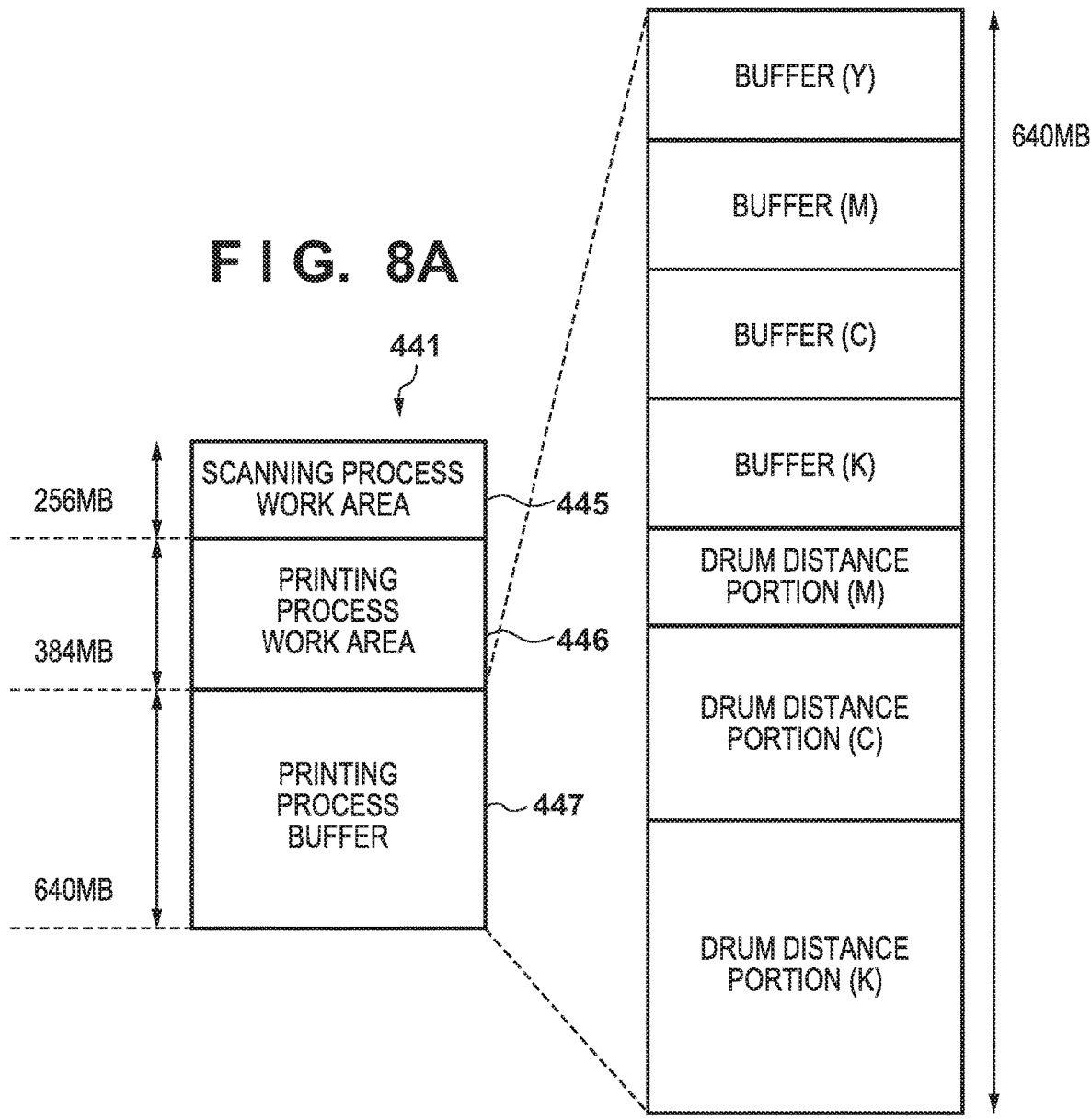

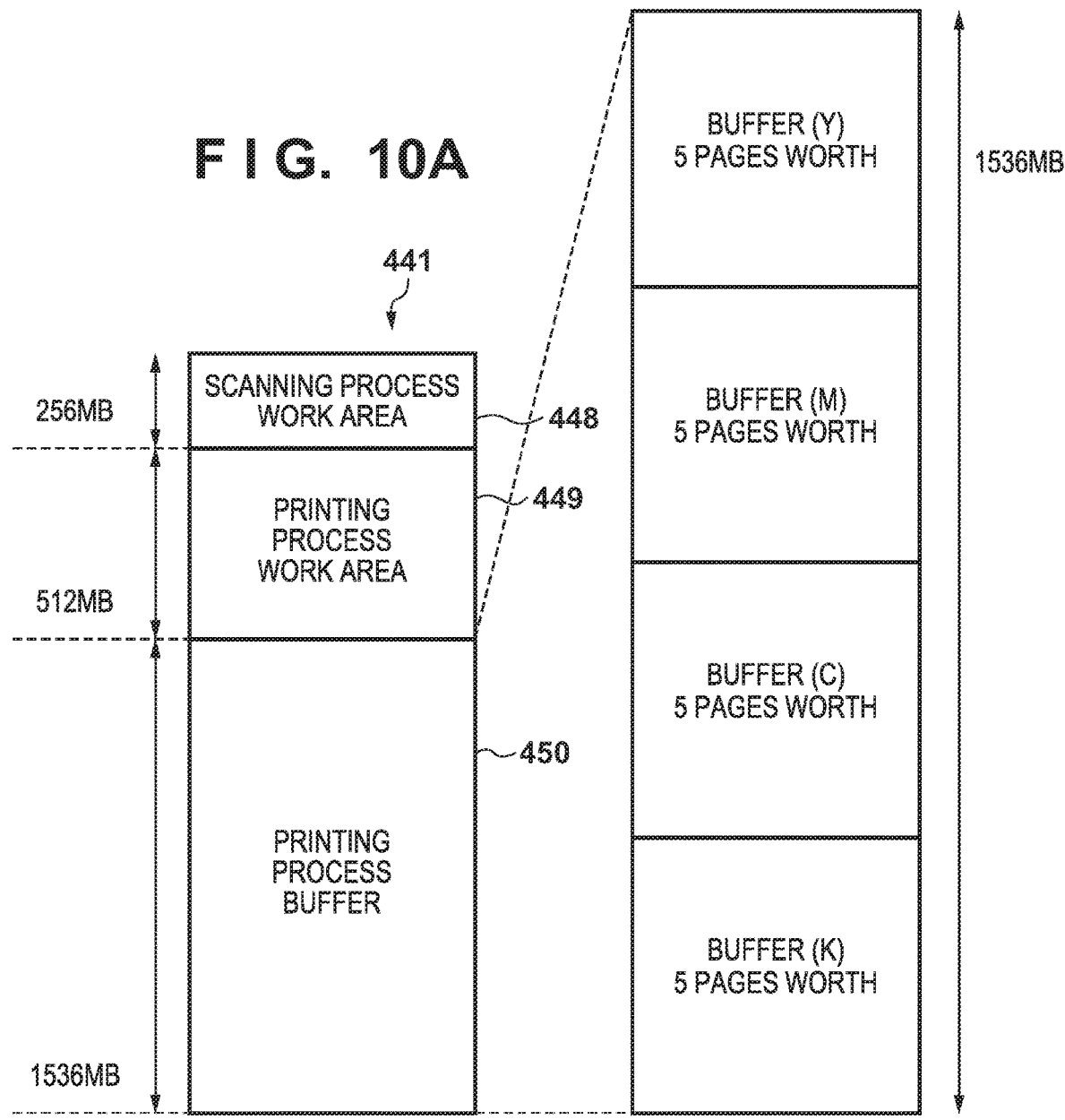

IMAGE FORMING APPARATUS, METHOD OF CONTROLLING THE SAME, AND STORAGE MEDIUM

BACKGROUND OF THE INVENTION

Field of the Invention

The present invention relates to an image forming apparatus, a method of controlling the same, and a storage medium.

Description of the Related Art

Previous image forming apparatuses have been required to process various functions, including a scanning function, a printer function, a copying function, a network function, and FAX sending/receiving, simultaneously and in parallel. It is therefore necessary for an image processing controller provided in an image forming apparatus to process image data at high speeds and in parallel.

Japanese Patent Laid-Open No. 2018-45367 proposes configuring an image processing controller from two domains, i.e., a system control domain including a CPU that controls the input and output of image data, and an image processing domain including a group of hardware which executes image processing. A distributed memory architecture is furthermore employed, in which working memory (RAM) for the system control domain and the image processing domain to work is provided independently for each domain. In other words, if the two domains do not compete for memory access, less bandwidth of the memory bus is required than when the domains share memory. The stated image processing controller therefore has an advantage in that it is easy to handle the processing of multiple functions simultaneously and in parallel.

On the other hand, fixing temperature control, which adjusts the temperature of a fixing unit in an image forming apparatus in accordance with the amount of applied toner on each page, is known in past image forming apparatuses. Controlling the fixing temperature makes it possible to reduce the fixing temperature for pages having a low amount of applied toner, which in turn makes it possible to reduce the power consumed by the image forming apparatus. Japanese Patent Laid-Open No. 2016-24408 proposes a technique in which fixing temperature control based on the amount of applied toner is skipped for blank images, on the basis of the amount of applied toner obtained for an input image and the result of determining whether the input image is a blank image.

However, this conventional technique has the following issue. In the above-described past techniques, for example, when the CPU of the system control domain executes a process for obtaining the stated amount of applied toner, that CPU must refer to an image processing result from the image processing domain in the image processing controller. In other words, the CPU must access the memory in the image processing domain (called "image processing memory" hereinafter) in the process for obtaining the amount of applied toner, and thus accesses from the system control domain increase in addition to the accesses within the image processing domain. This increases the bus bandwidth required by the image processing memory, which counteracts the positive effects of the distributed memory architecture. Increasing the bus bandwidth for the memory is problematic in that doing so increases costs.

SUMMARY OF THE INVENTION

The present invention enables the realization of a scheme in which, in an image processing controller having a distributed memory architecture, a CPU executes predetermined processing by referring to a processing result from an image processing domain, while at the same time suppressing an increase in the bus bandwidth required by image processing memory.

One aspect of the present invention provides an image forming apparatus comprising: a system control module that controls the image forming apparatus; a first memory device used by the system control module; an image processing module that processes image data to be inputted to the image forming apparatus; a second memory device in which image data processed by the image processing module is stored via an image memory bus; and a memory controller that transfers and writes the image data processed by the image processing module into the first memory device without going through the image memory bus, and issues an end interrupt to the system control module each time image data of a predetermined size has been written.

Another aspect of the present invention provides a method of controlling an image forming apparatus, the apparatus comprising: a system control module that controls the image forming apparatus; a first memory device used by the system control module; an image processing module that processes image data to be inputted to the image forming apparatus; and a second memory device in which image data processed by the image processing module is stored via an image memory bus, the method comprising: transferring and writing the image data processed by the image processing module into the first memory device without going through the image memory bus; and issuing an end interrupt to the system control module each time image data of a predetermined size has been written.

Still another aspect of the present invention provides a non-transitory computer-readable storage medium storing a program for causing a computer to execute each step of a method for controlling an image forming apparatus, the apparatus comprising: a system control module that controls the image forming apparatus; a first memory device used by the system control module; an image processing module that processes image data to be inputted to the image forming apparatus; and a second memory device in which image data processed by the image processing module is stored via an image memory bus, and the control method comprising: transferring and writing the image data processed by the image processing module into the first memory device without going through the image memory bus; and issuing an end interrupt to the system control module each time image data of a predetermined size has been written.

Further features of the present invention will be apparent from the following description of exemplary embodiments with reference to the attached drawings.

BRIEF DESCRIPTION OF THE DRAWINGS

FIGS. 5A to 5C are diagrams illustrating an example of memory allocation according to one embodiment.

FIGS. 7A and 7B are diagrams illustrating an example of a processing method for obtaining an amount of applied toner, according to one embodiment.

FIGS. 8A and 8B are diagrams illustrating an example of memory allocation according to one embodiment.

FIGS. 10A and 10B are diagrams illustrating an example of memory allocation according to one embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

An image forming apparatus according to the embodiments can be applied in an image forming apparatus that forms an image on a sheet using the electrophotographic method, such as a printing apparatus (printer), a photocopier, a multifunction peripheral (MFP), a facsimile apparatus, or the like, as well as in an image processing apparatus, an information processing apparatus, or the like. Note that a "multifunction peripheral" is an apparatus which has at least two functions out of multiple types of functions, including a printing function, a scanning function, a photocopying function, and a facsimile function, for example. The descriptions given here assume that the image forming apparatus is a multifunction peripheral (MFP).

First Embodiment

Figure 1:
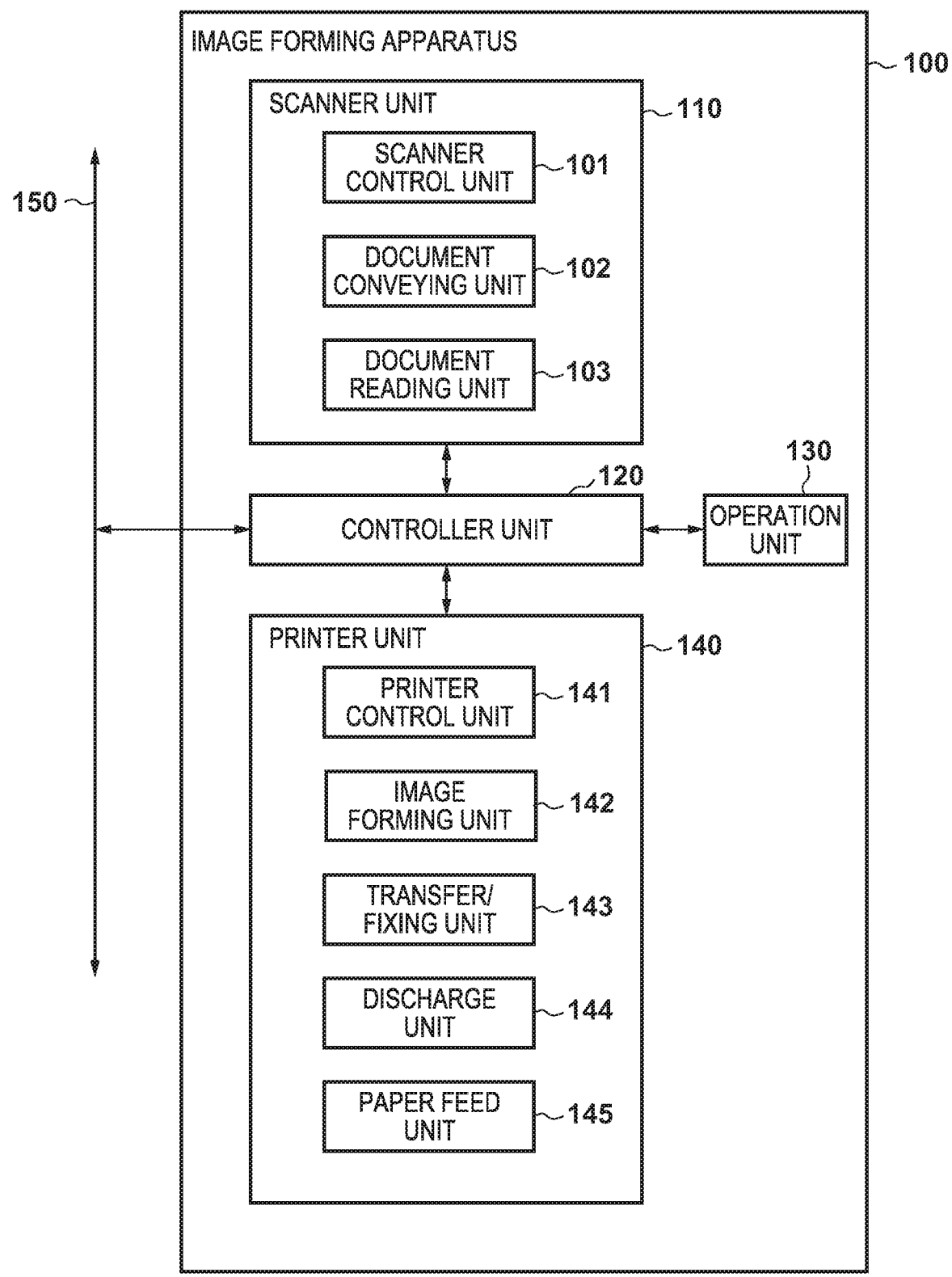
FIG. 1 is a schematic diagram illustrating a digital multifunction peripheral serving as an image forming apparatus according to one embodiment.

A first embodiment of the present invention will be described below. An example of the configuration of a digital multifunction peripheral serving as an image forming apparatus according to the present embodiment will be described with reference to FIG. 1.

An image forming apparatus 100 includes a scanner unit 110, a controller unit 120, an operation unit 130, and a printer unit 140. The scanner unit 110 has a function for optically reading a document and converting the document into image data. The scanner unit 110 includes a document conveying unit 102, constituted by a belt and the like that conveying the document; a document reading unit 103, constituted by a laser light source, a lens, and the like for optically reading the document; and a scanner control unit 101 that controls these units.

The printer unit 140 has a function for conveying a recording medium (paper) and printing image data onto the recording medium as a visible image. The printer unit 140 includes an image forming unit 142, which forms a toner image corresponding to the image data onto the paper using an electrophotographic process; and a transfer/fixing unit 143, which transfers and fixes the toner image. The printer unit 140 further includes a paper discharge unit 144, which sorts and staples printed paper and conveys that paper to the exterior of the apparatus; a paper feed unit 145, which feeds paper; and a printer control unit 141, which controls the units 142 to 145.

The controller unit 120 is electrically connected to the scanner unit 110 and the printer unit 140, and is furthermore connected to a network 150 such as a LAN, ISDN, the internet, an intranet, or the like. When a user uses a copying function, the controller unit 120 controls the scanner unit 110 to obtain the image data of a document, and controls the printer unit 140 to print an image onto paper and output the paper. Additionally, when a user uses a scanning function, the controller unit 120 controls the scanner unit 110 to obtain the image data of a document, convert the image data into code data, and transmit the code data to a host PC (not shown) or the like over the network 150. Additionally, when the user uses a printing function, the controller unit 120 converts print data (code data) received from the host PC over the network 150 into image data, and controls the printer unit 140 to print the image onto paper and output the paper.

The image forming apparatus 100 also has a fax receiving function for receiving data from an ISDN or the like and printing the data, a fax transmitting function for transmitting scanned data to an ISDN or the like, and so on. Execution instructions for the processing in each of these functions are referred to as a "job", and the image forming apparatus 100 executes predetermined processing in accordance with a job corresponding to each function.

The operation unit 130 is a user interface through which the user makes input operations, and is configured including a touch panel, various types of buttons, and so on, for example.

Configuration of Image Forming Unit

Figure 2:
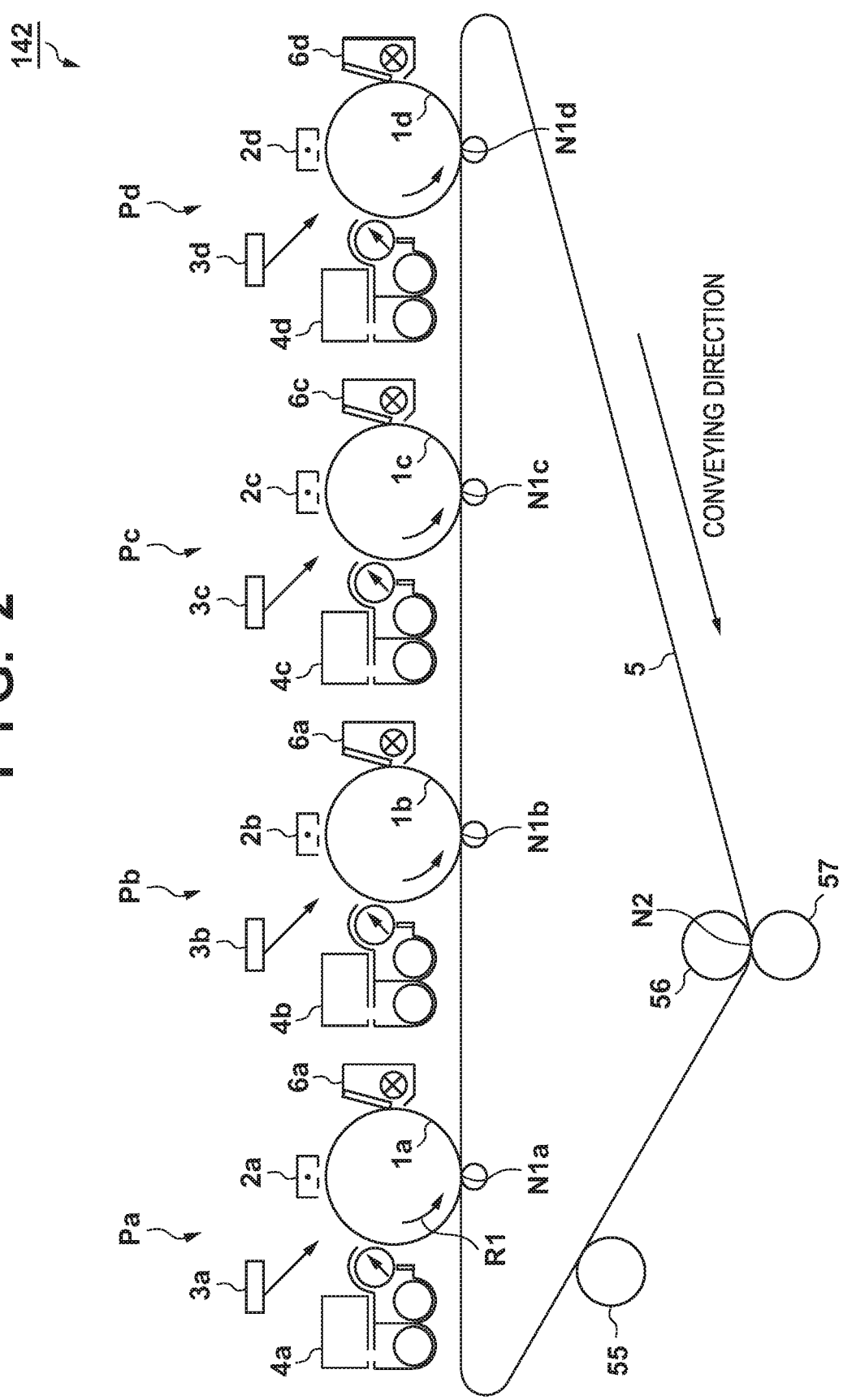
FIG. 2 is a schematic diagram illustrating an image forming unit according to one embodiment.

An example of the configuration of the image forming unit 142 according to the present embodiment, and operations for forming an image in a color image forming apparatus using the electrophotographic method, will be described next with reference to FIG. 2. The image forming unit 142 includes four photosensitive drums, and can form a full-color electrophotographic image using an intermediate transfer member. Process units P (Pa, Pb, Pc, and Pd), which form yellow, magenta, cyan, and black (Y, M, C, and K) images, respectively, are provided with photosensitive members 1 (1a, 1b, 1c, and 1d), respectively, and each photosensitive member is capable of rotating freely in the direction indicated by the arrows. Furthermore, corona chargers 2 (2a, 2b, 2c, and 2d), which serve as primary charging units, exposure devices 3 (3a, 3b, 3c, and 3d), and developing devices 4 (4a, 4b, 4c, and 4d) are arranged in order in the periphery of the corresponding photosensitive members 1 (1a, 1b, 1c, and 1d). Furthermore, cleaners 6 (6a, 6b, 6c, and 6d) are arranged along the rotation direction of the corresponding photosensitive members 1.

Each process unit P includes the photosensitive member 1, which serves as an image carrier supported in a freely-rotatable manner. The photosensitive member 1 includes a support shaft in its center, and is rotationally driven about the support shaft in the direction of an arrow R1. The corona charger 2 uniformly charges the surface of the photosensitive member 1 to a predetermined polarity and potential. The exposure device 3 scans while turning a laser beam corresponding to the image data on and off to form an electrostatic latent image on the irradiated photosensitive member 1. The developing device 4 forms a toner image on the photosensitive member 1 by using a magnetic brush in a developing region to cause toner to adhere to the exposed parts of the electrostatic latent image. An intermediate transfer unit 5 includes an intermediate transfer belt 51, transfer rollers 53 (53a, 53b, 53c, and 53d), secondary transfer rollers 56 and 57, and an intermediate transfer belt cleaner 55.

The different color toner images formed on the photosensitive members 1 (1a, 1b, 1c, and 1d) are transferred in sequence onto the intermediate transfer belt 51, and they are conveyed to a secondary transfer part N2 as the belt rotates. Furthermore, paper taken from a cassette is fed to a conveying roller and then conveyed to the secondary transfer part N2. At the secondary transfer part N2, the toner images are transferred onto the conveyed paper. Then, a fixing unit (not shown) fixes the toner on the paper using pressure and heat, resulting in a full-color image being formed. Note that the aforementioned process units acting on the photosensitive members 1 are comprehensively controlled by the printer control unit 141.

Internal Configuration of Controller Unit

Figure 3:
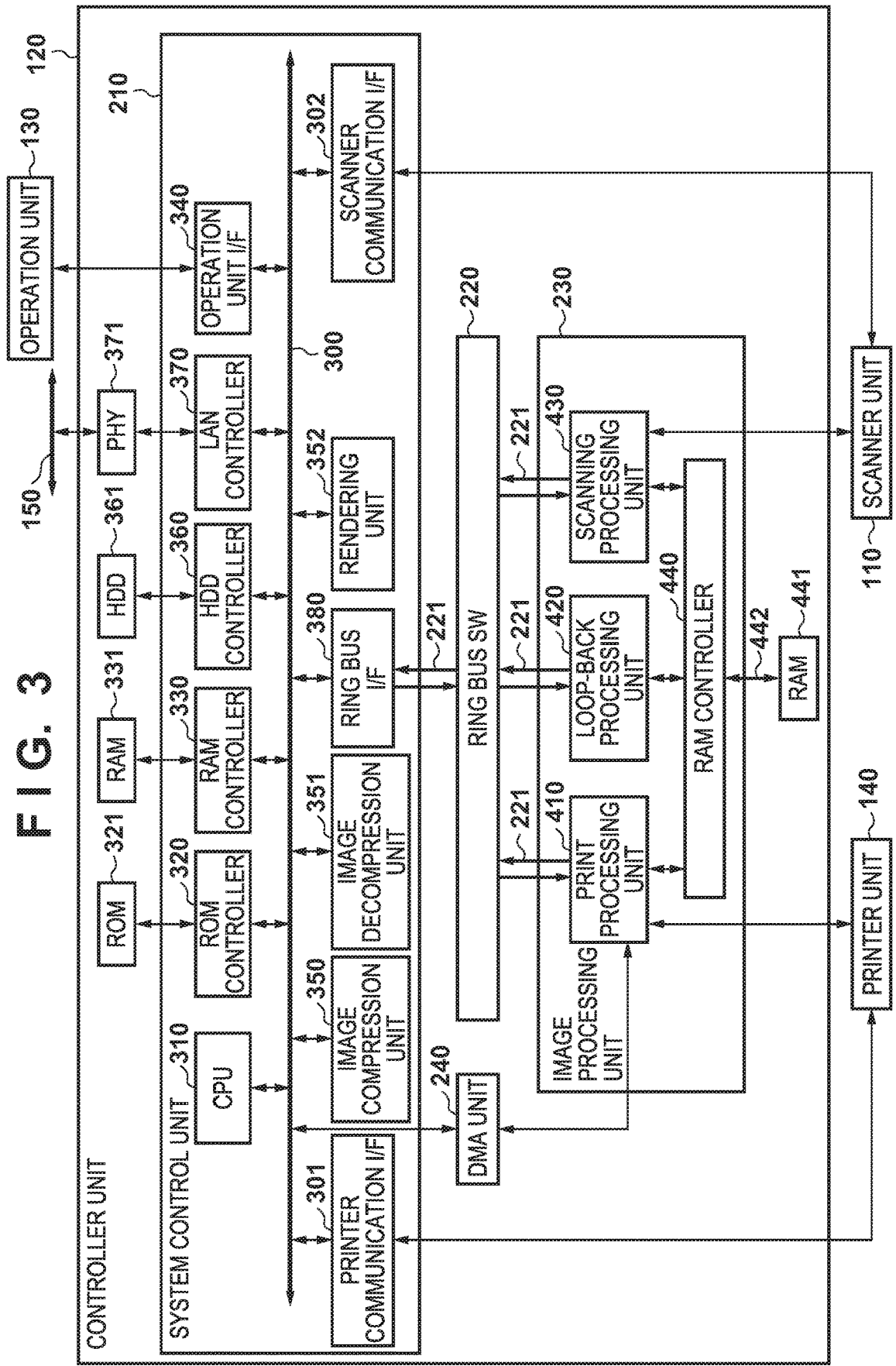
FIG. 3 is a schematic diagram illustrating the interior of a controller unit according to one embodiment.

The internal configuration of the controller unit 120 according to the present embodiment will be described next with reference to FIG. 3. The controller unit 120 includes a system control unit 210, a ring bus switch 220, an image processing unit 230, a DMA unit 240, ROM 321, RAM 331, an HDD 361, and a PHY 371.

The system control unit (system control module) 210 is connected to the ring bus switch 220 by a ring bus 221, and controls the transfer of image data used in scanning processes, printing processes, and so on via the ring bus switch 220 and the ring bus 221. The system control unit 210 also controls operation methods, operation timings, and so on of the printer unit 140, the scanner unit 110, and so on via a printer communication I/F 301, a scanner communication I/F 302, and so on. Furthermore, the system control unit 210 also plays a role of comprehensively controlling the internal system of the image forming apparatus as a whole, including the transmission of data to the network 150, the reception of data from the network 150, processes for making displays in the operation unit 130, and so on. The system control unit 210 includes a CPU 310, a ROM controller 320, a RAM controller 330, an HDD controller 360, a LAN controller 370, and an operation unit I/F 340. The system control unit 210 also includes the printer communication I/F 301, the scanner communication I/F 302, an image compression unit 350, an image decompression unit 351, a rendering unit 352, and a ring bus I/F 380.

The CPU 310 is a processor that controls the system as a whole. The CPU 310 comprehensively controls job processes, such as printing processes and scanning processes, in accordance with an OS, control programs, and the like loaded into the RAM (a first memory device) 331. The CPU 310 can also communicate with the printer control unit 141 and the scanner control unit 101 via the printer communication I/F 301 and the scanner communication I/F 302. The ROM controller 320 is a control module for accessing the ROM 321, which stores a system boot program. When the image forming apparatus 100 is turned on, the CPU 310 accesses the ROM 321 via the ROM controller 320 and executes a boot process.

The RAM controller 330 is a control module for accessing the RAM 331, which stores system control programs, image data, and so on. The RAM controller 330 includes a register for setting and controlling the RAM 331, and the register can be accessed from the CPU 310. An operation unit interface 340 accepts operational instructions made by the user operating the operation unit 130, and carries out control for displaying operation results.

The HDD 361 stores system software and application programs, image data and page information corresponding to each piece of image data, job information, and the like. The HDD 361 is connected to a system bus 300 via the HDD controller 360, and writes and reads out the data in accordance with instructions from the CPU 310. The LAN controller 370 is connected to the network 150 via the PHY 371, and inputs/outputs information, such as image data, to and from an external host computer.

The image compression unit 350 carries out a process for compressing the image data stored in the RAM 331 or the HDD 361 in the JPEG format. The image decompression unit 351 carries out a process for decompressing image data compressed in the JPEG format. The rendering unit 352 converts image data (PDL data) received from the network 150 through the LAN controller 370 into bitmap data which can be handled by the printer unit 140.

The ring bus I/F 380 is an interface which connects the system bus 300 within the system control unit 210 to the ring bus 221, which is outside the system control unit 210 and is centered on the ring bus switch 220. The ring bus I/F 380 transmits image data stored in the RAM 331 or the HDD 361 to the ring bus 221. The ring bus I/F 380 also stores image data received from the ring bus 221 in the RAM 331 or the HDD 361.

The ring bus switch 220 carries out switch control of the ring bus 221 for transferring image data to the various modules within the controller unit 120. In the present embodiment, the ring bus 221 for transferring image data to the various modules within the controller unit 120 is connected in a ring shape via the ring bus switch 220. As a result, the system control unit 210 can exchange image data with a print processing unit 410, a loop-back processing unit 420, and a scanning processing unit 430. Note that the image data flowing through the ring bus 221 in the present embodiment is image data compressed in the JPEG format by the image compression unit 350.

The image processing unit (image processing module) 230 includes the print processing unit 410, the loop-back processing unit 420, the scanning processing unit 430, and a RAM controller 440. The image processing unit 230 executes image processing required by the various functions of the image forming apparatus 100 on image data while sending and receiving the image data to and from the system control unit 210.

The print processing unit 410 carries out image processing for printing, including color space conversion processing and halftone processing, for the image data used by the printer unit 140. The print processing unit 410 receives image data from the system control unit 210 via the ring bus 221, carries out the image processing for printing on the image data, and outputs the processed image data to the printer unit 140.

The loop-back processing unit 420 carries out editing-related image processing which may be used in both printing processes and scanning processes, e.g., resizing processing, image synthesis processing, rotation processing, and so on. The loop-back processing unit 420 receives image data from the system control unit 210 via the ring bus 221, carries out the editing-related image processing on the image data, and outputs the processed image data to the ring bus switch 220. The image data transferred to the ring bus switch 220 is transferred to the system control unit 210 via the ring bus 221.

The scanning processing unit 430 carries out scanner image processing, such as shading correction processing, MTF correction processing, gamma correction processing, and filter processing, on the image data obtained by the scanner unit 110. The scanning processing unit 430 carries out the scanner image processing on image data transferred from the scanner unit 110, and transfers the processed image data to the ring bus switch 220. The image data transferred to the ring bus switch 220 is transferred to the system control unit 210 via the ring bus 221.

The RAM controller 440 carries out a process for writing image data received from the print processing unit 410, the loop-back processing unit 420, and the scanning processing unit 430 into RAM (a second memory device) 441 via an image processing memory bus 442. The RAM controller 440 furthermore carries out a process for reading out and transferring image data which was written into the RAM 441. The print processing unit 410, the loop-back processing unit 420, and the scanning processing unit 430 use the RAM 441 as a temporary image buffer for executing the image processing those units respectively handle. At this time, the image data from the print processing unit 410, the loop-back processing unit 420, and the scanning processing unit 430 traverse the image processing memory bus 442 between the RAM controller 440 and the RAM 441 in a multiplexed state. As such, if an amount of data transfer exceeding the processing capabilities (memory bus bandwidth capacity) of the image processing memory bus 442 is requested, a transfer standby state will arise. In other words, the memory bus bandwidth capacity of the image processing memory bus 442 can become a bottleneck for the processing capabilities of the controller unit 120 as a whole. Accordingly, in the present embodiment, the blocks that can access the RAM controller 440 are limited to only the print processing unit 410, the loop-back processing unit 420, and the scanning processing unit 430. The DMA unit (a memory controller) 240 has a function for transferring image data between the print processing unit 410 and the RAM 331 without being controlled by the CPU 310.

Internal Configurations of Print Processing Unit and DMA Unit

Figure 4:
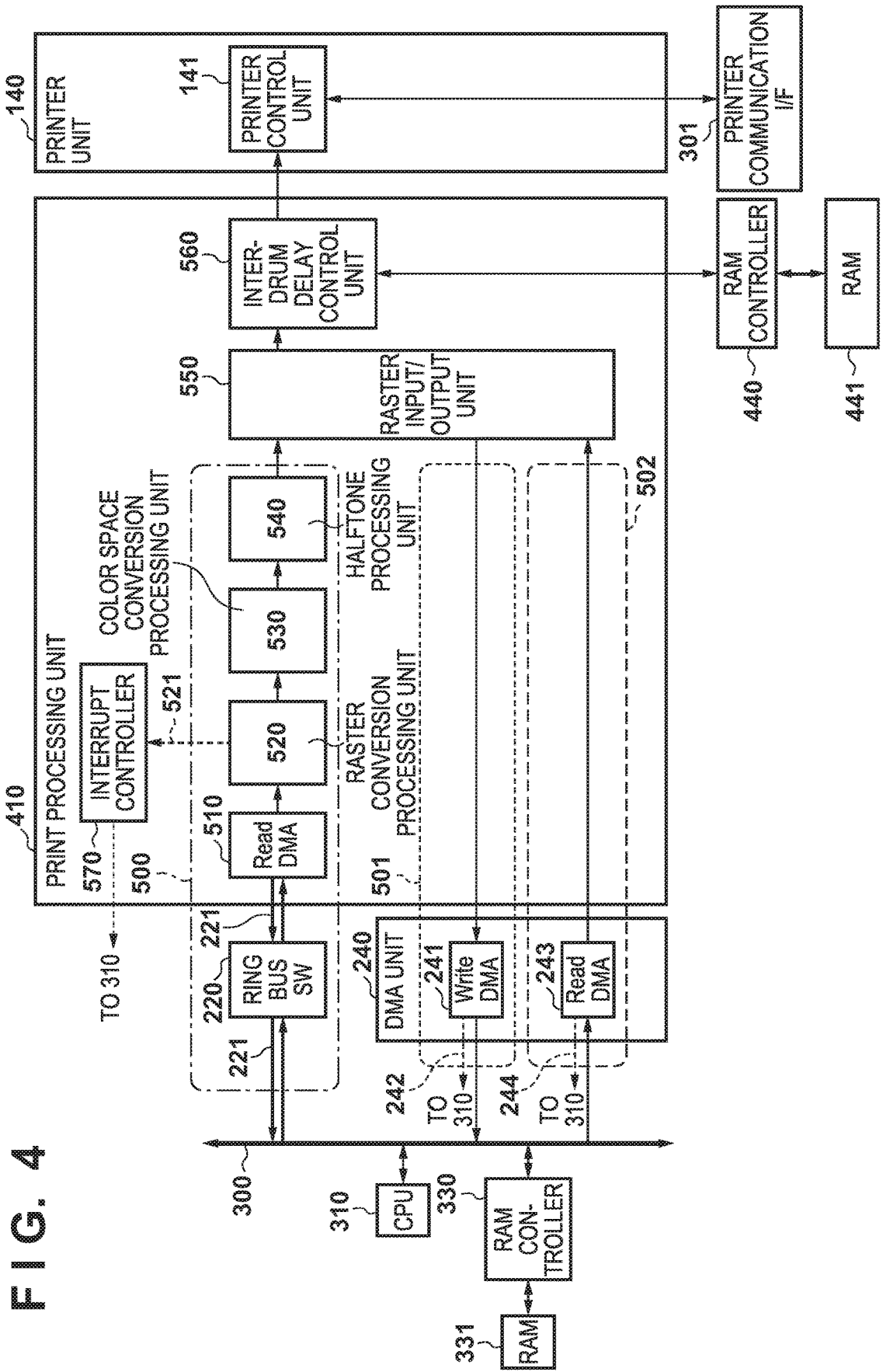
FIG. 4 is a schematic diagram illustrating the interior of a print processing unit and a DMA unit according to one embodiment.

The internal configurations of the print processing unit 410 and the DMA unit 240 according to the present embodiment will be described next with reference to FIG. 4. The print processing unit 410 includes three data paths, namely a normal print path 500, an image extraction path 501, and an image input path 502. The normal print path 500 and the image extraction path 501 can be operated in parallel.

A Read DMA 510 receives image data stored in the RAM 331 or the HDD 361 via the ring bus 221, and outputs that data to a raster conversion processing unit 520. The raster conversion processing unit 520 carries out a JPEG decompression process and a rasterizing process on the received image data, and generates raster image data constituted by RGB data and attribute data, the attribute data indicating data attributes for each pixel. For example, the RGB data colors and attribute data are expressed in 10 bits, from 0 to 1023, with a resolution expressed in 600 dpi. Note that the format of the raster image data is determined by the configuration, properties, and so on of the scanner unit 110, and is not limited to that mentioned here. The raster conversion processing unit 520 issues an interrupt 521 indicating that a predetermined number of lines' worth of the rasterizing process is complete (called a "mark line interrupt" hereinafter) in accordance with a pre-set number of lines of the rasterizing process. The CPU 310 is notified of the mark line interrupt 521 along with various other types of interrupt signals (not shown) via an interrupt controller 570. The CPU 310 controls an inter-drum delay control unit 560 (described later) on the basis of the timing at which the notification of the mark line interrupt 521 has been made.

A color space conversion processing unit 530 converts the received raster image data into CMYK data in accordance with the colors of the toner used by the printer unit 140. At this time, the attribute data is referenced at the pixel level, and the conversion to CMYK data is carried out using parameters based on the attribute data. The raster image data which has been converted into the generated CMYK data is output to a halftone processing unit 540.

The halftone processing unit 540 executes halftone processing on each color of the CMYK data corresponding to the raster image data, which has been output from the color space conversion processing unit 530. Screen processing or error diffusion processing can be given as specific examples of the processing carried out by the halftone processing unit. Screen processing uses a predetermined plurality of dither matrices and the input image data to create N-nary values. Additionally, error diffusion processing is processing in which the input image data is compared with a predetermined threshold to create N-nary values, with the differences between the input image data and the threshold at that time being distributed to the surrounding pixels subject to the N-nary value processing carried out thereafter. The halftone processing unit 540 can also refer to the attribute data at the pixel level and select screen processing, error diffusion processing, or the like in accordance with the attribute data. Data format conversion for after the halftone processing is determined in accordance with the resolution, bit precision, and so on of the printer. For example, each color of the post-halftone processing CMYK data is expressed as 1 bit, i.e., 0 or 1, and with a resolution of 2,400 dpi. Raster image data corresponding to the CMYK data, which has been generated through the above-described processing and can be printed, is output to a raster input/output unit 550.

The raster input/output unit 550 can receive the raster image data from the normal print path 500 and output that data to the inter-drum delay control unit 560 and the image extraction path 501 simultaneously. The raster input/output unit 550 can also receive the raster image data from the normal print path 500 or the image input path 502 and output that data to the inter-drum delay control unit 560.

The inter-drum delay control unit 560 controls the reading and writing of each CMYK color of the raster image data to and from the RAM 441. When forming an image, it is necessary to adjust the printing timing of each CMYK color by an amount of time equivalent to the drum intervals between the photosensitive members 1 corresponding to the CMYK colors at a recording paper conveying speed (called a "print engine speed"). Accordingly, the inter-drum delay control unit 560 temporarily buffers each CMYK color of the raster image data in the RAM 441 and reads out the image data at a printing timing corresponding to the distances between the CMYK color drums. At this time, the inter-drum delay control unit 560 starts reading out the image data in response to a readout start instruction from the CPU 310 based on the mark line interrupt 521 issued from the raster conversion processing unit 520. This makes it possible to accurately superimpose the printed CMYK images at the photosensitive members 1 for the respective colors. The raster image data read out at the delay timing between the CMYK drums is output to the printer control unit 141 and printed.

A Write DMA 241 receives halftone image data output from the halftone processing unit 540 via the raster input/output unit 550, and stores the received halftone image data in the RAM 331 via the system bus 300 and the RAM controller 330. After storing the halftone image data in the RAM 331, the Write DMA 241 notifies the CPU 310 of a Write DMA end interrupt 242. As a result, the CPU 310 can reference the halftone image data from the RAM 331 in the system control domain when executing the print, without accessing the RAM 441 in the image processing domain via the image processing unit 230. In other words, the CPU 310 can reference the halftone image data and obtain the amount of applied toner without counteracting the positive effects of the distributed memory architecture.

A Read DMA 243 receives uncompressed raster image data stored in the RAM 331 via the system bus 300 and the RAM controller 330, and outputs that data to the raster input/output unit 550. The raster image data input by the Read DMA 243 is provided in a directly-printable format. In other words, the data is in the same format as the raster image data generated by the halftone processing unit 540 (e.g., each color of the CMYK data is expressed as 1 bit, i.e., 0 or 1, with a resolution of 2,400 dpi). After outputting the raster image data to the raster input/output unit 550, the Read DMA 243 notifies the CPU 310 of a Read DMA end interrupt 244. Accordingly, the uncompressed raster image data stored in the RAM 331 can be printed directly, without carrying out the image processing 520 to 540 for printing.

Memory Allocation

An example of memory allocation in the RAM 441 according to the present embodiment will be described next with reference to FIGS. 5A to 5C. FIG. 5A illustrates an example of memory allocation in the RAM 441. Sizes of 256 MB, 512 MB, and 512 MB are allocated to the image processing memory bus 442, a printing process work area 443, and an inter-drum delay control printing process buffer 444, respectively.

FIG. 5B illustrates an example of memory allocation in the printing process buffer 444. The printing process buffer 444 is used as a buffer for the raster image data by the inter-drum delay control unit 560. Memory corresponding to a buffer portion for each of the CMYK colors, and a drum distance portion for each of the MYK colors, is allocated in the printing process buffer 444. Here, the buffer portion is buffer memory for absorbing a difference in the speeds of writing and reading out image data to and from the RAM 441. The drum distance portion of each of the MYK colors is memory that is prepared with a data size corresponding to the inter-drum distance of the photosensitive members 1 for each of the CMYK colors, illustrated in FIG. 5C, and the recording paper conveying speed, and is used for adjusting the printing timing. A drum distance portion (M) defines a value corresponding to the distance between the photosensitive member 1a and the photosensitive member 1b. Likewise, a drum distance portion (C) defines a value corresponding to the distance between the photosensitive member 1a and the photosensitive member 1c, and a drum distance portion (K) defines a value corresponding to the distance between the photosensitive member 1a and the photosensitive member 1d.

Processing Flow

Figure 6A:
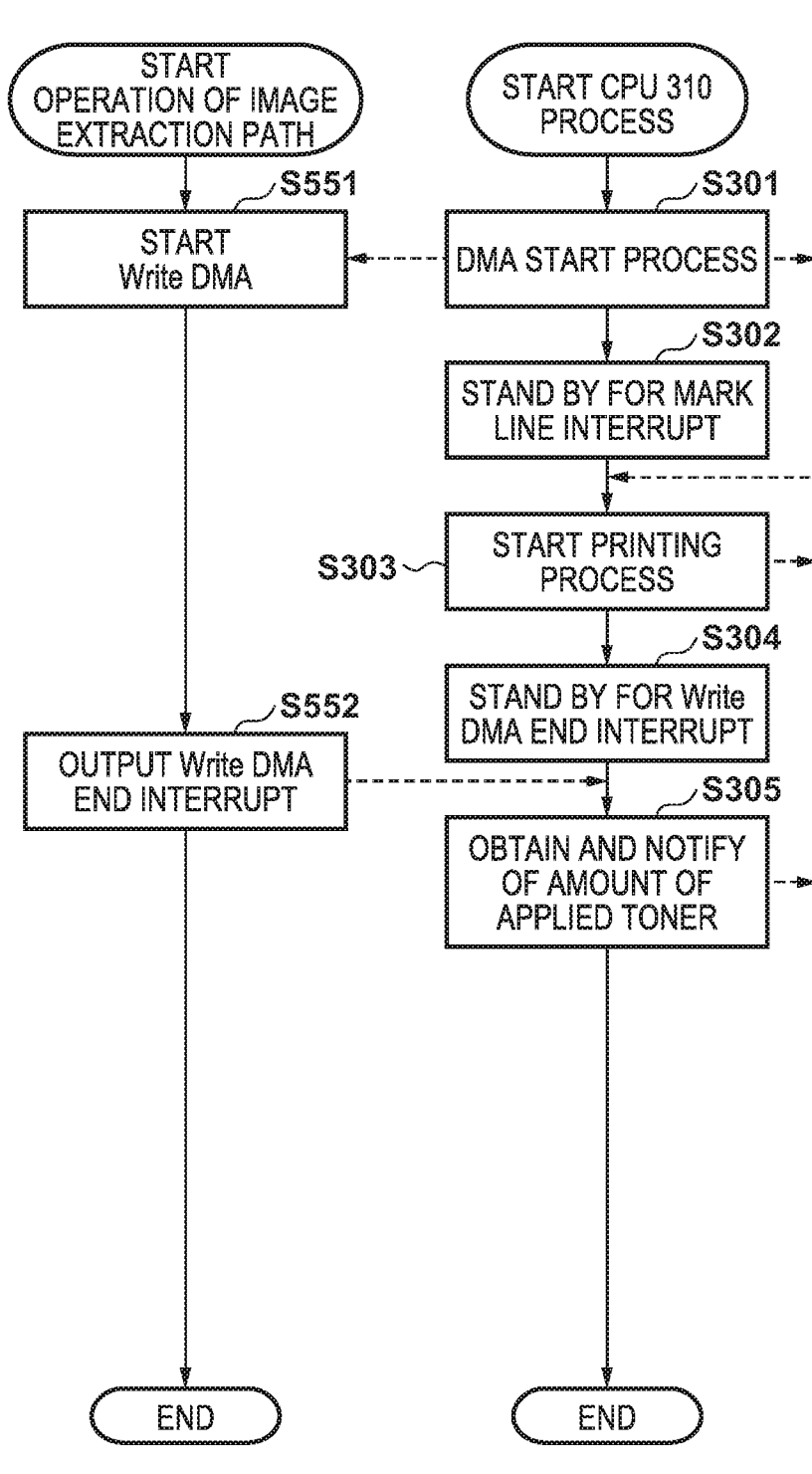
FIGS. 6A and 6B are diagrams illustrating the flow of print execution according to one embodiment.
Figure 6B:
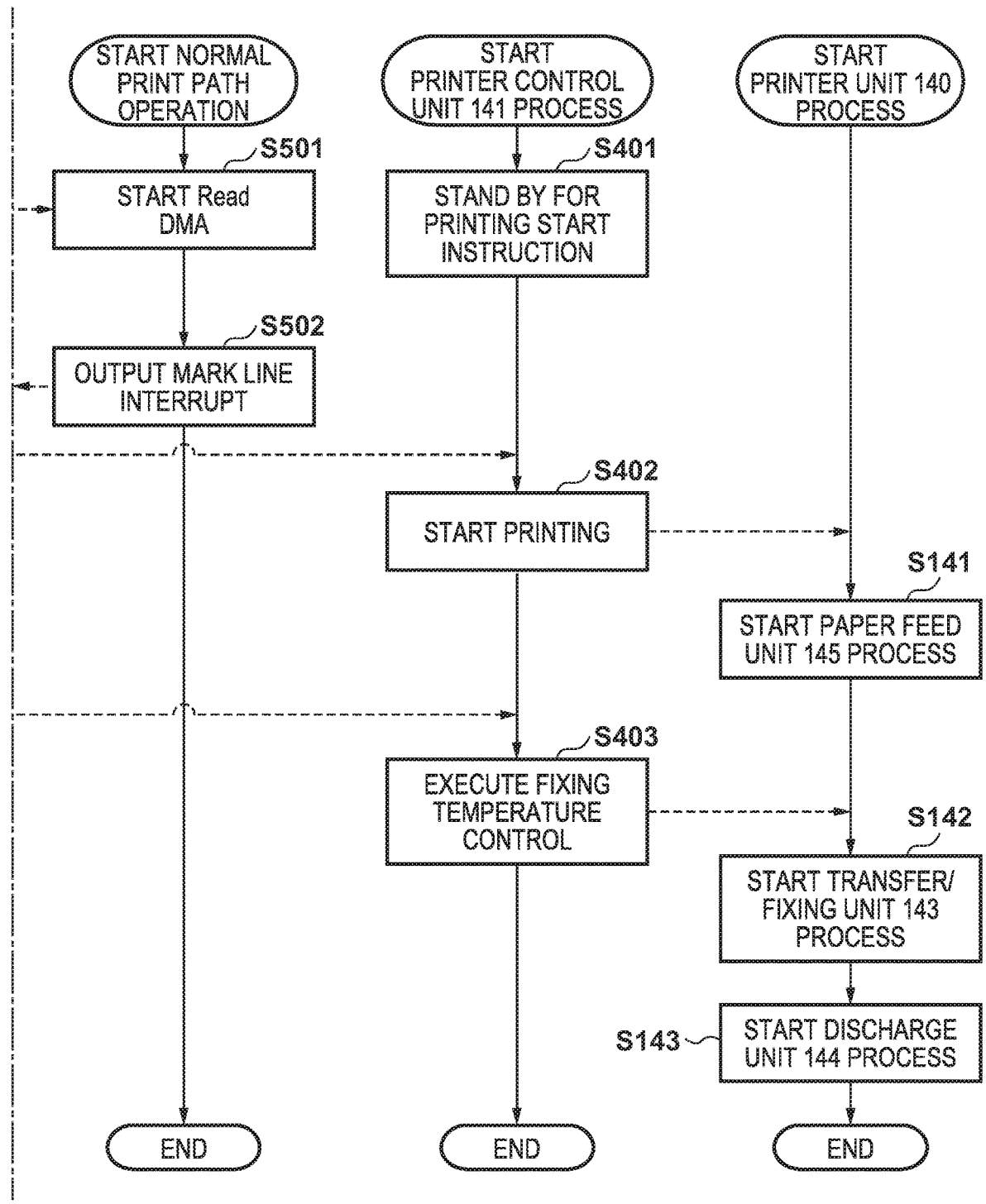

Next, the flow of processing by the CPU 310 and the printer control unit 141 when printing a single page according to the present embodiment will be described with reference to FIGS. 6A and 6B. FIGS. 6A and 6B illustrate the relationships of the operations of the normal print path 500 and the image extraction path 501 along with the processing executed by the CPU 310.

In step S301, the CPU 310 starts the Read DMA 510 and the Write DMA 241. The respective DMAs start operating thereafter in steps S501 and S551. At this time, the halftone image data processed by the halftone processing unit 540 is stored in the RAM 441 via the inter-drum delay control unit 560, and at the same time, is also stored in the RAM 331 via the Write DMA 241.

Next, in step S302, the CPU 310 stands by until the raster conversion processing unit 520 makes a notification of the mark line interrupt 521. On the other hand, the printer control unit 141 stands by until a printing start instruction has been issued from the CPU 310 in step S401.

Additionally, in step S502, the raster conversion processing unit 520 issues the mark line interrupt 521, indicating that a predetermined number of lines' worth of the rasterizing process is complete, in accordance with a pre-set number of lines of the rasterizing process. After confirming that the mark line interrupt 521 has been received, in step S303, the CPU 310 instructs the printer control unit 141 to start printing via the printer communication I/F 301. In step S304, the CPU 310 stands by until the Write DMA 241 makes a notification of the Write DMA end interrupt 242. On the other hand, having received the printing start instruction, the printer control unit 141 starts printing using the printer unit 140 in step S402. In step S141, the printer unit 140 starts feeding paper using the paper feed unit 145.

In step S552, after storing the halftone image data in the RAM 331, the Write DMA 241 issues the Write DMA end interrupt 242. After confirming the reception of the Write DMA end interrupt 242, in step S305, the CPU 310 obtains the amount of applied toner by referring to the halftone image data stored in the RAM 331. Furthermore, the CPU 310 notifies the printer control unit 141 of the obtained amount of applied toner via the printer communication I/F 301. On the other hand, the printer control unit 141 controls the fixing temperature of the transfer/fixing unit 143 in accordance with the received amount of applied toner. For example, the printer control unit 141 notifies the printer unit 140 of a control value pertaining to the fixing temperature. Then, in step S142, the printer unit 140 controls the transfer/fixing unit 143 to fix the toner at a desired temperature to the paper fed by the paper feed unit 145, and in step S143, the post-fixing paper is discharged to the exterior of the apparatus by the paper discharge unit 144.

Method for Obtaining Amount of Applied Toner

Next, an example of a process for obtaining the amount of applied toner, executed by the CPU 310 according to the present embodiment, will be described with reference to FIG. 7. Here, the "amount of applied toner" refers to the amount of toner per unit of area, and the unit will be described as a percentage. Specifically, this is defined so that when the maximum value of the amount of applied toner for each of the CMYK colors is taken as 100%, superimposing the maximum value for two colors results in an amount of applied toner of 200% for that pixel. Each color has gradation properties, and can therefore take on any value from 0 to 100%. For example, in a full-color printing mode, there is a higher maximum toner amount for image data that fully uses the four CMYK colors of toner, whereas with a black-and-white image using only K, there is a lower maximum toner amount.

FIG. 7A illustrates part of a halftone image stored by the Write DMA 241 in the RAM 331, where 335 indicates a single pixel, which is the smallest unit, and 336 indicates a pixel block, which is a unit of 3×3 pixels. The numerical values within each frame representing a pixel in FIG. 7A indicate the amount of applied toner for each pixel as obtained by the CPU 310.

The CPU 310 uses the 3×3 pixel block as a unit, and obtains an average value of the amount of applied toner within the pixel block. Here, the reason the average value within the pixel block is obtained is that the temperature required to fix an image generally depends not on the amount of applied toner at the level of individual pixels, but on the amount of toner within a set range. Although the average value within the pixel block is obtained here, the configuration may be such that a minimum value or a maximum value within the pixel block is used instead. Note that 337 in FIG. 7B indicates pixel block units (3×3 pixels), and numerical values written within the frame representing each pixel block indicates the average value of the amount of applied toner within that pixel block.

Once the average values of the amounts of applied toner within the processed pixel blocks have been successfully obtained, the CPU 310 notifies the printer control unit 141 of the maximum value, among the average values of all the blocks within the processed image data, as toner applied amount information for the page in question. In the example of FIG. 7B, the printer control unit 141 is notified of a maximum average value of 140.

In the controller unit 120 according to the present embodiment, that the bandwidth capacity of the image processing memory bus 442 can become a bottleneck for the processing capabilities of the controller unit 120 as a whole is as described above. In conventional controllers, it has been necessary for the CPU to go through a memory controller, and image processing memory bus, or the like when accessing data stored in the image processing memory. There have thus been situations where a burden has been placed on the bandwidth of the image processing memory bus, causing the processing capabilities of the controller as a whole to drop. In the present embodiment, the CPU 310 can execute predetermined processing by referring to image processing data held in the system control domain, without producing an increase in access to the image processing memory bus 442, by using the raster input/output unit 550 and the Write DMA 241.

As described thus far, the image forming apparatus according to the present embodiment includes the system control module, which controls the image forming apparatus, and the RAM 331, which is used by the system control module. Additionally, the image forming apparatus includes the image processing module, which processes the image data input to the image forming apparatus, and the RAM 441, in which the image data processed by the image processing module is stored via the image memory bus. Furthermore, the image forming apparatus transfers and writes the image data processed by the image processing module into the RAM 331 without going through the image memory bus, and notifies the system control module of an end interrupt each time image data of a predetermined size has been successfully written. Each time the end interrupt is received, the system control module refers to the halftone image data written into the RAM 331 and obtains the amount of applied toner corresponding to that image data. Thus according to the present embodiment, the system control module can refer to the data of a halftone image when processing that image without going through the image memory bus, which makes it possible to suppress an increase in the bus bandwidth required from the image processing memory.

Second Embodiment

A second embodiment of the present invention will be described below. If the image extraction path 501 is operated at the same time as the normal print path 500 as in the foregoing first embodiment, data transfers from the Write DMA 241 to the system bus 300 will increase. As a result, there is a problem in that depending on the amount of data traffic flowing in the system bus 300, the transfer speed of the image data to the print processing unit 410 through the system bus 300 will be unable to keep up with the print engine speed, which causes print execution errors. Accordingly, the present embodiment will describe a method which ensures that a print execution error does not arise even when a high level of data traffic is flowing in the system bus 300, by changing the timing at which the mark line interrupt is issued, the size of the buffer region, and so on.

Memory Allocation

First, an example of memory allocation in the RAM 441 according to the present embodiment will be described with reference to FIGS. 8A and 8B. Unlike in the first embodiment, in FIG. 8A, sizes of 256 MB, 384 MB, and 640 MB are allocated to a scanning process work area 445, a printing process work area 446, and an inter-drum delay control printing process buffer 447, respectively.

FIG. 8B illustrates an example of memory allocation in the printing process buffer 447. Compared to the printing process buffer allocation in the foregoing first embodiment, a greater size is secured for the buffer region of each color in FIG. 8B. On the other hand, the size of the printing process work area 446, which is the work region for the printing process, has been reduced.

Setting Flow

Figure 9:
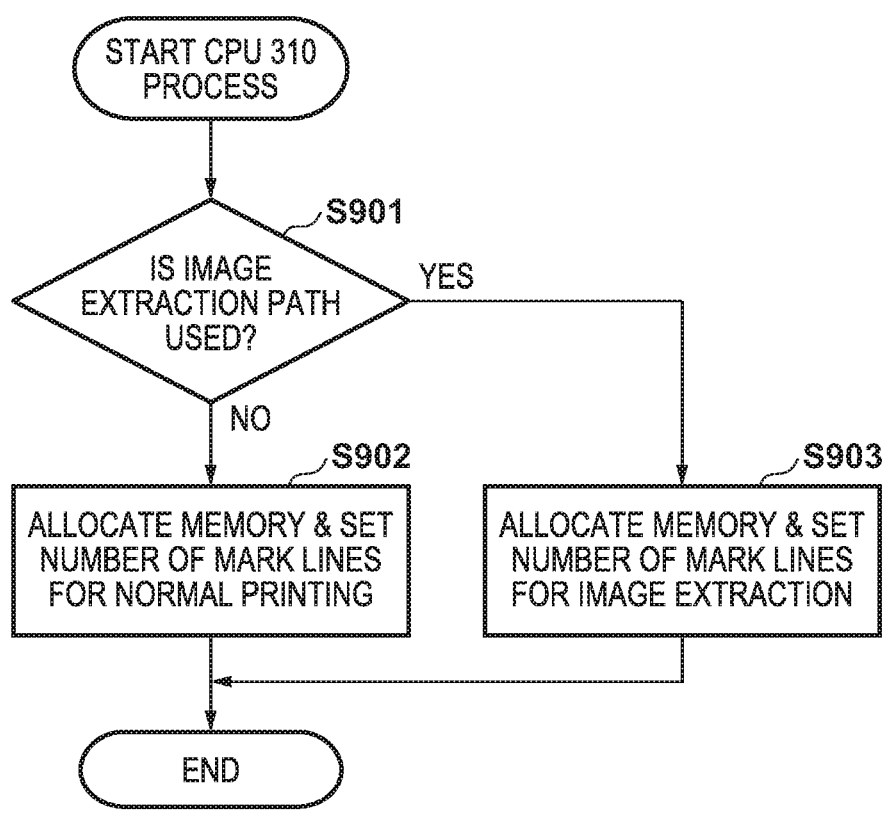
FIG. 9 is a diagram illustrating a flow for setting memory allocation according to one embodiment.

An example of a flow for setting the memory allocation in the RAM 441, executed by the CPU 310, according to the present embodiment will be described next with reference to FIG. 9. This flow is executed before step S301 in the processing flow carried out when executing a print, described using FIGS. 6A and 6B.

In step S901, the CPU 310 determines whether or not the job to be executed is a printing process which uses the image extraction path 501. If the image extraction path 501 is not used, i.e., if only the normal print path 500 is used (No in step S901), the process moves to step S902. However, if both the image extraction path 501 and the normal print path 500 are used (Yes in step S901), the process moves to step S903.

In step S902, the CPU 310 changes the memory allocation in the RAM 441 for normal printing, as illustrated in FIGS. 5A to 5C. Furthermore, the CPU 310 changes the setting for the number of lines already subject to the rasterizing process by the raster conversion processing unit 520 (the mark line setting) for normal printing, and ends the process. On the other hand, in step S903, the CPU 310 changes the memory allocation in the RAM 441 for image extraction, and ends the process. At this time, the buffer allocation for the printing process is increased through the memory allocation for normal printing, as illustrated in FIGS. 8A and 8B. Furthermore, the CPU 310 changes the mark line setting for image extraction to be greater than the number of lines for normal printing.

Through this, when the image extraction path 501 is operated, a greater buffer region for the printing process can be secured, and the timing at which the mark line interrupt is output can be delayed by increasing the mark line setting. Furthermore, a greater amount of image data can be stored in the buffer for the printing process. As a result, even if the data transfer speed for inputs to the normal print path 500 has dropped, the difference in speeds between writing and reading out the image data to and from the printing process buffer 447 can be absorbed, which makes it possible to execute the printing process normally.

As described thus far, when executing a received job, the image forming apparatus according to the present embodiment determines whether or not the job is one in which image data is transferred. If image data is to be transferred, the image forming apparatus allocates a greater amount of the RAM 441 as a buffer region for storing the image data than in a situation where no image data is to be transferred. The image forming apparatus furthermore changes the predetermined number of lines at which the mark line interrupt is issued to a greater number than in a situation where no image data is transferred. Thus according to the present embodiment, increasing the memory allocation for the printing process buffer when operating the image extraction path makes it possible to suppress a drop in the input data transfer speed to the normal print path, which can arise due to increased traffic in the data flowing in the system bus 300. The occurrence of printing process errors when operating the image extraction path can therefore be suppressed.

Furthermore, the mark line setting, printing process buffer size, and so on for a situation where the image extraction path operates may be changed in accordance with the processing load on the CPU 310, the speed of the print engine, and so on.

Third Embodiment

A third embodiment of the present invention will be described below. The foregoing first and second embodiments describe the CPU executing a process for obtaining the amount of applied toner using the image data transferred to the image processing memory by DMA in the image extraction path, and then executing fixing temperature control based on the obtained result. However, if the process for obtaining the amount of applied toner is executed by the CPU, the process for obtaining the amount of applied toner may take some time, depending on the processing capabilities of the CPU, the complexity of the process, and so on. Even if a fixer executes temperature control, it takes some time for controlling the temperature of the fixer to a target fixing temperature determined from information of the amount of applied toner. Generally speaking, it is necessary to notify the printer engine of the toner applied amount information for a plurality of pages (e.g., three pages) before starting a print. The present embodiment will describe a printing process flow for a case that takes into account such fixing temperature control, the time required for the process to obtain the amount of applied toner, and so on. Note that the present embodiment will describe an example in which the printer engine is notified of information of the amount of applied toner for the previous three pages for the purpose of fixing temperature control.

Memory Allocation

First, an example of memory allocation in the RAM 441 according to the present embodiment will be described with reference to FIGS. 10A and 10B. Unlike the foregoing first and second embodiments, the memory allocation in the RAM 441 is set as illustrated in FIG. 10A. Specifically, sizes of 256 MB, 512 MB, and 1536 MB are allocated to a scanning process work area 448, a printing process work area 449, and an inter-drum delay control printing process buffer 450, respectively.

FIG. 10B illustrates an example of memory allocation in the printing process buffer 450. Unlike the printing process buffer allocation in the foregoing first and second embodiments, in FIG. 10B, a buffer for five pages' worth of each color (a predetermined number of pages) is secured. Because a buffer capable of storing an entire page is secured, the drum distance portion buffers for M, C, and K are not needed. The reasoning behind the sizes of the buffers will be described later with reference to FIGS. 12A and 12B.

Processing Flow

Figure 11A:
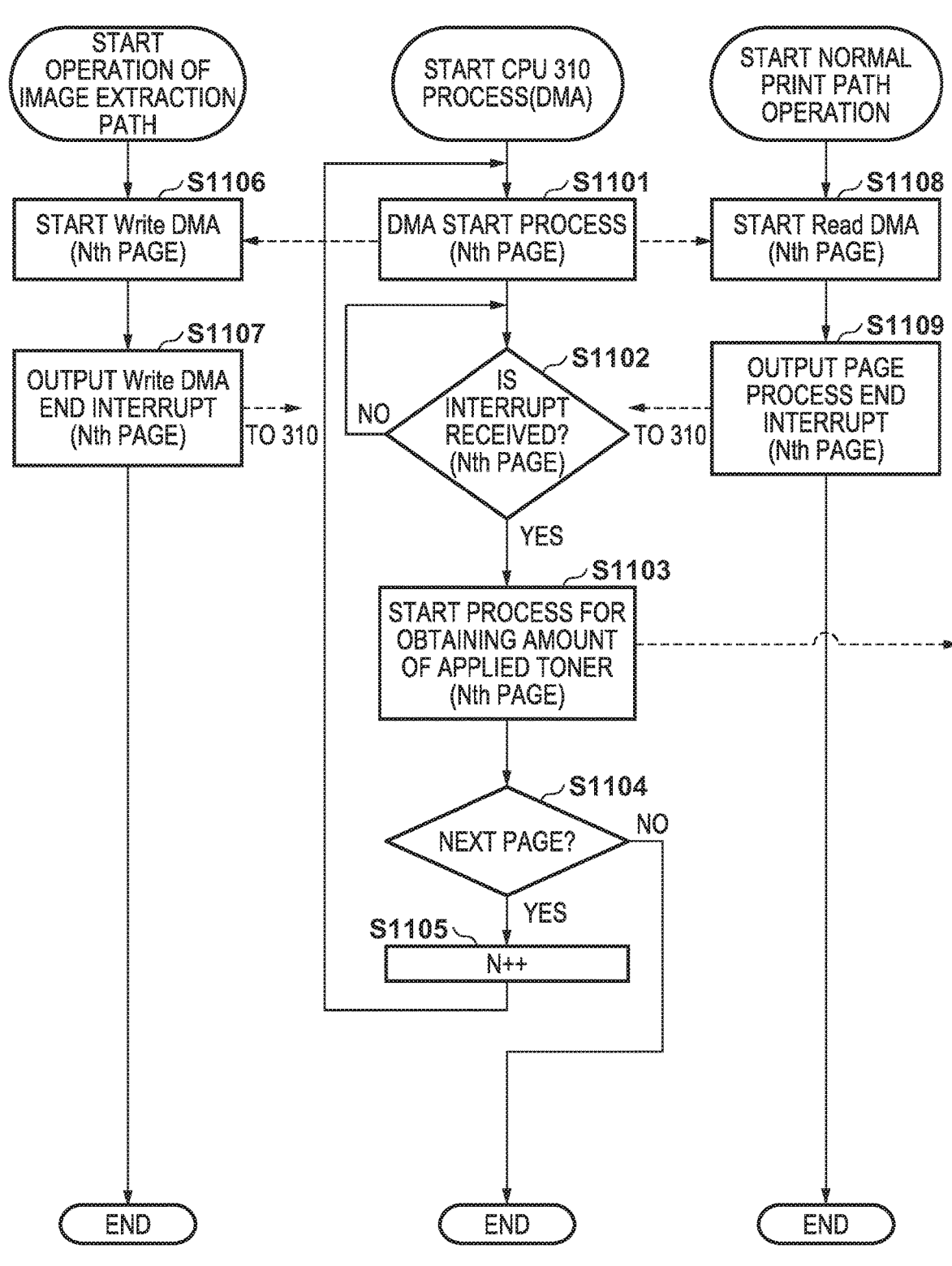
FIGS. 11A and 11B are diagrams illustrating the flow of print execution according to one embodiment.
Figure 11B:
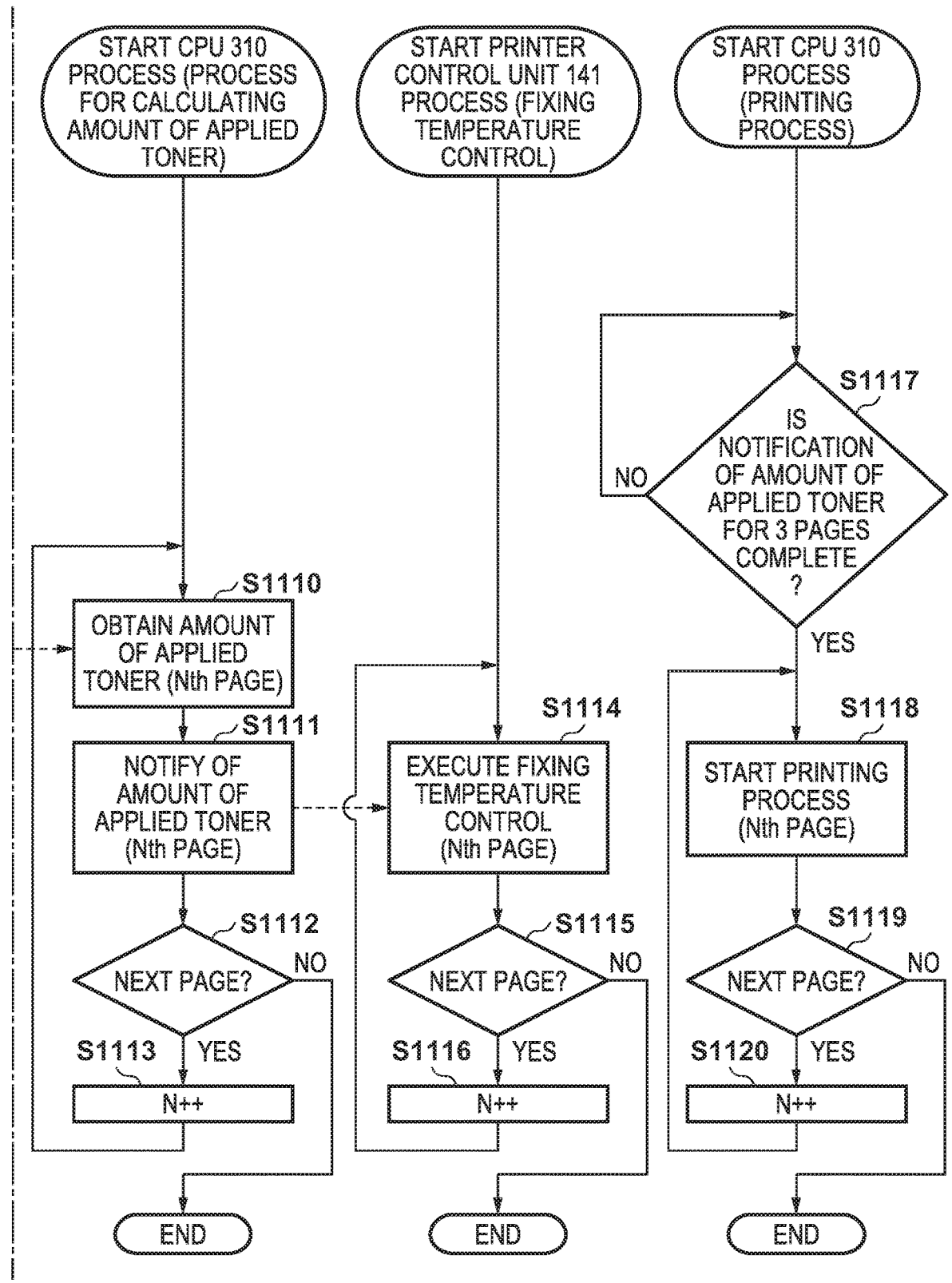

Next, the flow of processing by the CPU 310 and the printer control unit 141 when printing a plurality of pages according to the present embodiment will be described with reference to FIG. 11. FIG. 11 illustrates the relationships of the operations of the normal print path 500 and the image extraction path 501 along with the processing executed by the CPU 310. Steps S1101 to S1109 indicate the flow of processing executed by the CPU 310 and DMA transfer in the normal print path 500 and the image extraction path 501.

In step S1101, the CPU 310 starts the Read DMA 510 and the Write DMA 241 for an Nth page. Here, N represents the page number in the job for which printing is being executed. In step S1102, the CPU 310 stands by to receive a page interrupt, which indicates the end of processing for the Nth page in the normal print path 500 and the image extraction path 501. Upon receiving the page interrupt, in step S1103, the CPU 310 refers to the halftone image data of the Nth page, stored in the RAM 331 by the Write DMA 241 in the image extraction path 501, and starts executing a process for obtaining the amount of applied toner for the Nth page.

Next, in step S1104, the CPU 310 determines whether or not there is a process for DMA transfer of the next page, after the process for obtaining the toner has been started. If so, the process moves to step S1105, and if not, the DMA transfer flow ends. In step S1105, the CPU 310 determines that there is a process for the DMA transfer of the next page, and the process returns to step S1101.

In step S1106, the Write DMA 241 for the Nth page starts in response to a DMA start instruction from the CPU 310 in step S1101. In step S1107, after storing the halftone image data of the image extraction path 501 in the RAM 331, the Write DMA 241 issues the Write DMA end interrupt 242. On the other hand, in step S1108, the Read DMA 510 for the Nth page starts in response to a DMA start instruction from the CPU 310 in step S1101. In step S1109, when all of the halftone image data of the Nth page has been transferred to the raster input/output unit 550 in the normal print path 500, a page interrupt indicating the end of processing for the page is issued to the CPU 310. Here, the page interrupt indicating the end of processing for the page may be the mark line interrupt 521 from the raster conversion processing unit 520, or may be an end interrupt (not shown) issued by the halftone processing unit 540.

Steps S1110 to S1113 in FIG. 11 indicate the flow of processing executed by the CPU 310 to obtain the amount of applied toner. In step S1110, the CPU 310 refers to the halftone image data of the Nth page, stored in the RAM 331, at the timing at which the process for obtaining the toner for the Nth page is started in step S1103, and executes the process for obtaining the amount of applied toner. In step S1111, the CPU 310 notifies the printer control unit 141 of the amount of applied toner for the Nth page, obtained in step S1110, via the printer communication I/F 301. Then, in step S1112, after making the notification of the amount of applied toner, the CPU 310 determines whether there is a process for obtaining the amount of applied toner for the next page. If so, the process moves to step S1113, and if not, the flow of processing for obtaining the amount of applied toner ends. In step S1113, the CPU 310 determines that there is a process for obtaining the amount of applied toner for the next page, and the process returns to step S1110.

Steps S1114 to S1116 in FIG. 11 indicate the flow of a process for controlling the fixing temperature, executed by the printer control unit 141. In step S1114, the printer control unit 141 starts the control of the fixing temperature of the transfer/fixing unit 143 in accordance with the amount of applied toner for the Nth page, received in step S1111. Then, in step S1115, after starting the control of the fixing temperature for the Nth page, the printer control unit 141 determines whether or not there is a notification of the amount of applied toner for the next page. If there is such a notification, the process moves to step S1116, whereas if there is no such notification, the flow of the process for controlling the fixing temperature ends. In step S1116, the printer control unit 141 determines that there is a notification of the amount of applied toner for the next page, and the process returns to step S1114.

Steps S1117 to S1120 in FIG. 11 indicate the flow of a printing process executed by the CPU 310. In step S1117, the CPU 310 stands by until the printer control unit 141 has been notified of the amount of applied toner in step S1111 for three pages. In step S1118, after the notification of the amount of applied toner for three pages is complete, the CPU 310 instructs the printer control unit 141 to start printing the Nth page, via the printer communication I/F 301. In step S1119, after starting the printing for the Nth page, the CPU 310 determines whether there is a printing process for the next page. If so, the process moves to step S1120, and if not, the flow of the printing process ends. In step S1120, the CPU 310 determines that there is a printing process for the next page, and the process returns to step S1118.

Timing Chart

Next, an example of a timing chart illustrating a print image process in the normal print path 500, the process for making a notification of the amount of applied toner executed by the CPU 310, and the printing process carried out by the printing process buffer 444 and the printer unit 140, when printing a plurality of pages, will be described with reference to FIGS. 12A and 12B.

Figure 12A:
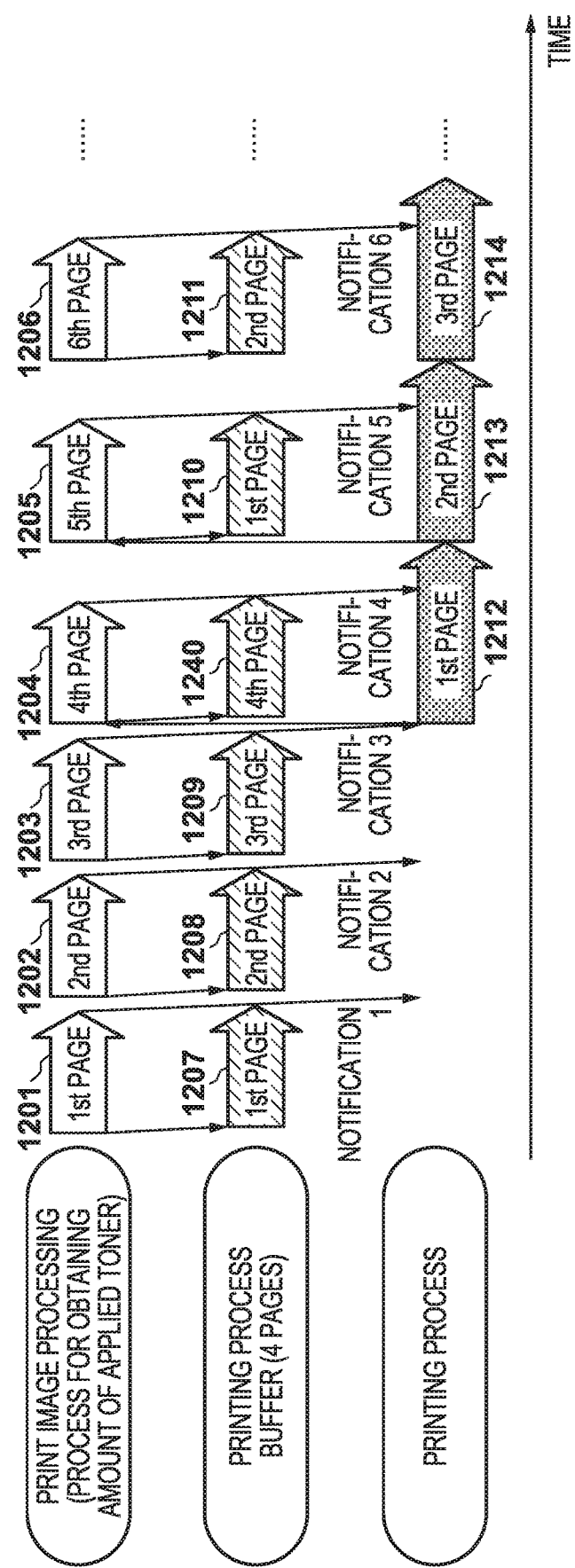
FIGS. 12A and 12B are diagrams illustrating an example of a timing chart for a printing process according to one embodiment.

FIG. 12A is a timing chart illustrating a case where the process for obtaining the amount of applied toner is executed by hardware in the blocks within the normal print path 500 (e.g., the halftone processing unit 540). 1201 to 1206 indicate a timing chart for print image processing in the normal print path 500. 1207 to 1211 and 1240 indicate a timing chart for storing image data in the printing process buffer 444. 1212 to 1214 indicate a timing chart for a printing process carried out by the printer unit 140.

In FIG. 12A, first, print image processing 1201 for the first page in the normal print path 500, and storage 1207 of the first page of halftone image data in the printing process buffer 444, are executed in parallel. At this time, when the amount of applied toner is obtained through the print image processing for the first page, the CPU 310 notifies the printer control unit 141 of the amount of applied toner for the first page (notification 1).

Similarly, the print image processing (1202 to 1206), the storage of the data in the buffer (1208 to 1211 and 1240), and the notification of the amount of applied toner (notifications 2 to 5), are carried out for the second and subsequent pages. Once the notification for the amount of applied toner for the third page (notification 3) has ended, a printing process 1212 for the first page is started by the printer unit 140.

Furthermore, once the printing process 1212 for the first page is complete, all of the data for the first page which is stored in the buffer is transferred to the printer unit 140, and thus the buffer region in which the first page had been stored becomes empty. At that timing, the halftone image for the fifth page is stored in the empty region of the buffer (1210). Thus when the process for obtaining the amount of applied toner is executed by hardware, four pages' worth of buffer is required for the time in which the various types of processes are carried out.

Next, a timing chart for a case where the CPU 310 executes the process of obtaining the amount of applied toner using software will be described with reference to FIG. 12B. 1215 to 1221 indicate a timing chart for print image processing in the normal print path 500. 1222 to 1227 indicate a timing chart for the process of obtaining the amount of applied toner, and the notification process, executed by the CPU 310. 1228 to 1234 indicate a timing chart for storing image data in the printing process buffer 444. 1235 to 1237 indicate a timing chart for a printing process carried out by the printer unit 140.

Figure 12B:
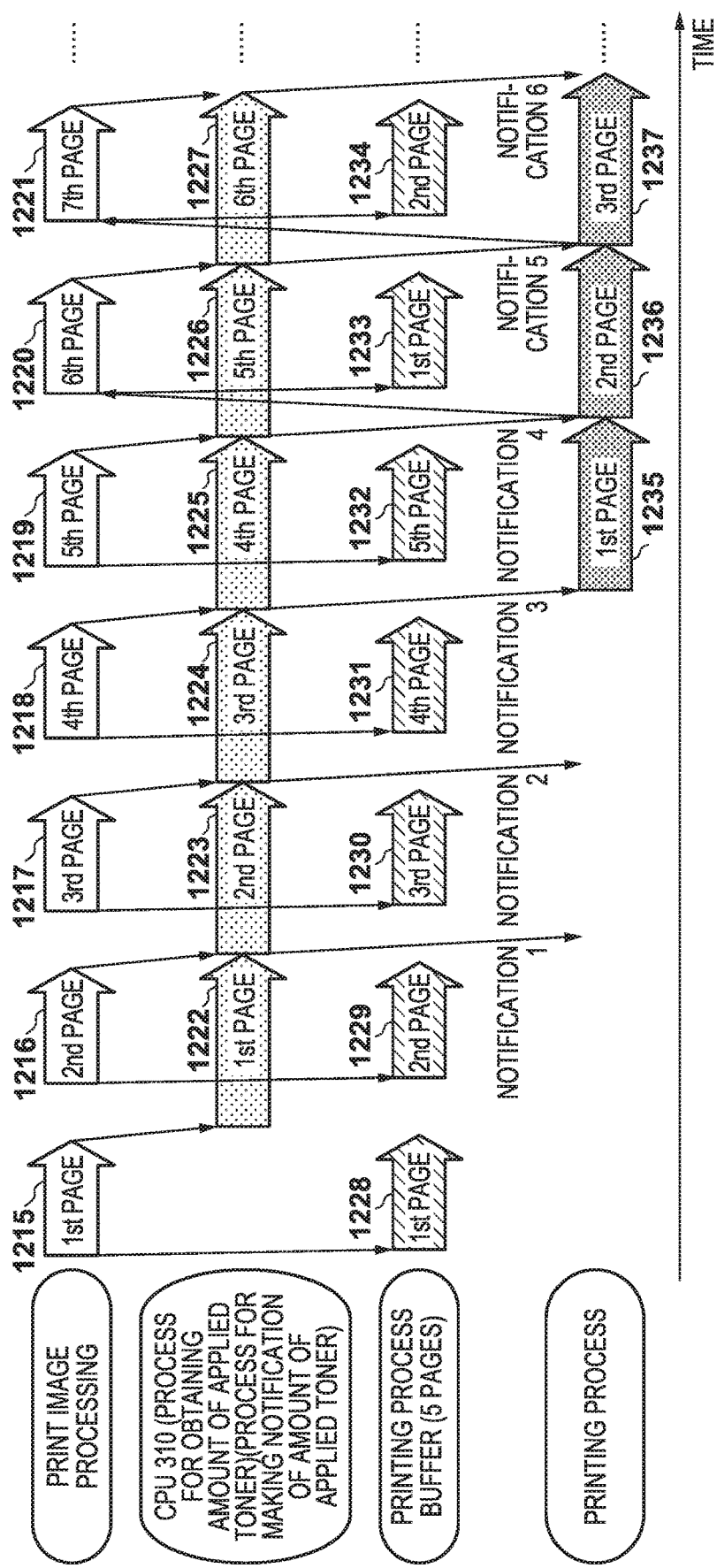

As in FIG. 12A, in FIG. 12B, first, print image processing 1215 for the first page in the normal print path 500, and storage 1228 of the first page of halftone image data in the printing process buffer 444, are executed in parallel. Then, once the print image processing 1215 for the first page is complete, the CPU 310 starts the process 1222 for obtaining the amount of applied toner for the first page. Furthermore, when the process 1222 for obtaining the amount of applied toner, executed by the CPU 310, is complete, the CPU 310 notifies the printer control unit 141 of the amount of applied toner for the first page (notification 1).

Similarly, the print image processing (1216 to 1221), the storage of the data in the buffer (1229 to 1234), and the processes for obtaining and making a notification of the amount of applied toner (1223 to 1227; notifications 2 to 6), are carried out for the second and subsequent pages. Once the notification for the amount of applied toner for the third page (notification 3) has ended, a printing process 1235 for the first page is started by the printer unit 140. Furthermore, once the printing process 1235 for the first page is complete, the buffer region in which the first page had been stored becomes empty. At that timing, the halftone image for the sixth page is stored in the empty region of the buffer (1233). Thus when the process for obtaining the amount of applied toner is executed by software as in the present embodiment, five pages' worth of buffer is required for the time in which the various types of processes are carried out.

According to the present embodiment as described thus far, an interrupt is issued upon the halftone image data of a predetermined number of pages being stored in the RAM 331, and the process for obtaining the amount of applied toner is executed by the system control module. Thus in the present embodiment, a printer processing buffer for a plurality of pages is secured as a buffer region in the RAM 441, taking into account the fixing temperature control, the time taken by the process for obtaining the amount of applied toner, and so on. Furthermore, the timings of the halftone image data storage, the notification of the amount of applied toner, and the printing process are controlled for each page. This makes it possible to execute the fixing temperature control and the printing process at an appropriate timing, in accordance with the time taken to obtain the amount of applied toner, the processing time required for the fixing temperature control, and so on.

Although the present embodiment describes a buffer size of five pages, the buffer size may be changed in accordance with the amount of data in the page subject to the printing process, the processing speed of the CPU 310, the printing speed, and the state of data traffic flowing in the system bus 300. Furthermore, the buffer size may be changed in accordance with the state of execution of the process for obtaining a toner count (i.e., hardware or software), as illustrated in FIGS. 12A and 12B.

According to the present invention, in an image processing controller having a distributed memory architecture, a CPU can execute predetermined processing by referring to a processing result from an image processing domain, while at the same time suppressing an increase in the bus bandwidth required by image processing memory.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-046378 filed on Mar. 13, 2019, which is hereby incorporated by reference herein in its entirety.

What is claimed is:

1. An image forming apparatus comprising:
   a system control module that controls the image forming apparatus;
   a first memory device used by the system control module;
   an image processing module that processes image data to be input to the image forming apparatus;
   a second memory device in which image data processed by the image processing module is stored via an image memory bus; and
   a memory controller that transfers and writes the image data processed by the image processing module into the first memory device without going through the image memory bus, and issues an end interrupt to the system control module each time image data of a predetermined size has been written.

2. The image forming apparatus according to claim 1,
   wherein the image data processed by the image processing module is halftone image data; and
   each time the end interrupt is received from the memory controller, the system control module refers to the halftone image data written into the first memory device and obtains an amount of applied toner corresponding to that image data.

3. The image forming apparatus according to claim 2, further comprising:
   an image forming unit that forms an image onto a recording medium in accordance with the image data processed by the image processing module,
   wherein the image forming unit controls a fixing temperature used when forming the image onto the recording medium on the basis of the amount of applied toner obtained by the system control module.

4. The image forming apparatus according to claim 3,
   wherein for each page on which an image is formed, the system control module obtains an average value of the amount of applied toner in a predetermined unit of blocks, each block being constituted by a plurality of pixels, and notifies the image forming unit of the maximum average value for that page via the image processing module.

5. The image forming apparatus according to claim 3,
   wherein when a predetermined image process for a predetermined number of lines ends, the image processing module issues a line interrupt to the system control module; and
   upon receiving the line interrupt, the system control module instructs the image forming unit to start image formation.

6. The image forming apparatus according to claim 5,
   wherein the system control module:
   determines, when a job accepted by the image forming apparatus is to be executed, whether or not the job is a job in which image data is transferred by the memory controller; and
   in a case where image data is to be transferred, allocates a greater buffer region in the second memory device for storing the image data than when image data is not to be transferred, and changes the predetermined number of lines to be greater than when image data is not to be transferred.

7. The image forming apparatus according to claim 1, wherein the predetermined size indicates image data of a predetermined number of pages;
the image data processed by the image processing module is halftone image data; and
each time the end interrupt is received from the memory controller, the system control module refers to the halftone image data of the predetermined number of pages written into the first memory device and obtains an amount of applied toner corresponding to each page.

8. The image forming apparatus according to claim 7, further comprising:
an image forming unit that forms an image onto a recording medium in accordance with the image data processed by the image processing module,
wherein the image forming unit controls a fixing temperature used when forming the image onto the recording medium on the basis of the amount of applied toner obtained by the system control module.

9. The image forming apparatus according to claim 8, wherein when a predetermined image process for a predetermined page ends, the image processing module issues a page interrupt to the system control module; and
the system control module:
changes a buffer region in the second memory device for storing the image data on the basis of at least one of a time needed to process the image data stored in the first memory device and a time needed to control the fixing temperature; and
upon receiving the page interrupt for the predetermined number of pages, instructs the image forming unit to start image formation.

10. The image forming apparatus according to claim 9, wherein the system control module:
allocates a region for storing image data of each of colors, for at least the predetermined number of pages, for which image formation is to be carried out, as a buffer region in the second memory device for storing the image data.

11. The image forming apparatus according to claim 1, wherein the memory controller transfers and writes the image data processed by the image processing module into the first memory device via a system bus.

12. A method of controlling an image forming apparatus, the apparatus comprising:
a system control module that controls the image forming apparatus;
a first memory device used by the system control module;
an image processing module that processes image data to be input to the image forming apparatus; and
a second memory device in which image data processed by the image processing module is stored via an image memory bus,
the method comprising:
transferring and writing the image data processed by the image processing module into the first memory device without going through the image memory bus; and
issuing an end interrupt to the system control module each time image data of a predetermined size has been written.

13. A non-transitory computer-readable storage medium storing a program for causing a computer to execute each step of a method for controlling an image forming apparatus, the apparatus comprising:
a system control module that controls the image forming apparatus;
a first memory device used by the system control module;
an image processing module that processes image data to be input to the image forming apparatus; and
a second memory device in which image data processed by the image processing module is stored via an image memory bus,
and the control method comprising:
transferring and writing the image data processed by the image processing module into the first memory device without going through the image memory bus; and
issuing an end interrupt to the system control module each time image data of a predetermined size has been written.

* * * * *